July 11, 1944.    S. J. LINDSKOG    2,353,345
LAWN RENOVATING MACHINE
Filed Sept. 8, 1941    2 Sheets-Sheet 1

INVENTOR
SEGFRID J. LINDSKOG
BY
Munn, Liddy, Flaccum + Kane
ATTORNEYS

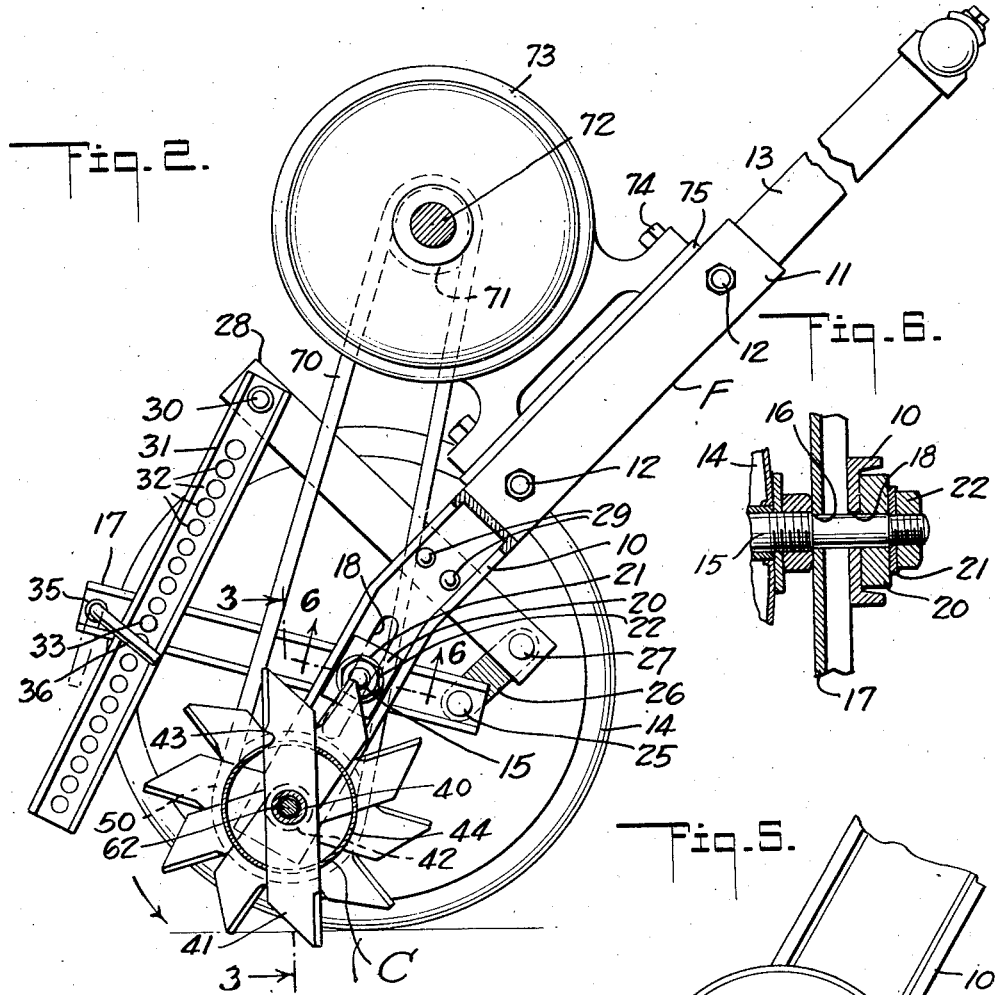
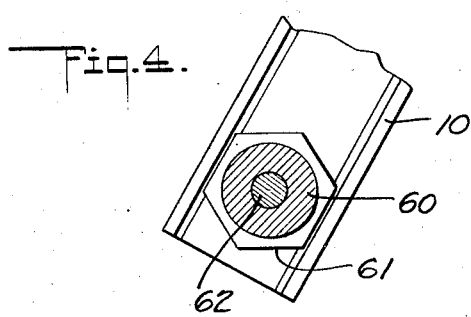
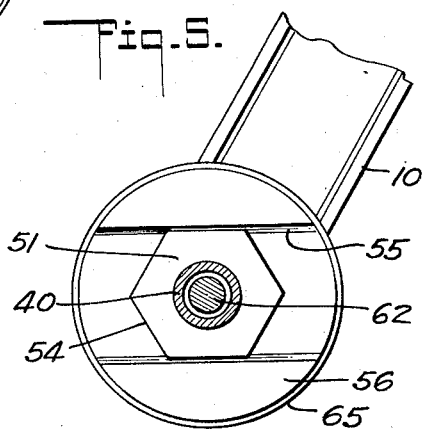

Patented July 11, 1944

2,353,345

UNITED STATES PATENT OFFICE 2,353,345

LAWN RENOVATING MACHINE

Segfrid J. Lindskog, Los Angeles, Calif.

Application September 8, 1941, Serial No. 410,015

9 Claims. (Cl. 97—40)

This invention relates to lawn renovating machines of the general character embodied in my co-pending application Serial No. 365,147, filed Nov. 12, 1940, now Patent 2,273,120, wherein is disclosed and claimed, a machine for operating upon Bermuda and other pest growths having runners or vines which lie close to the ground, so as to facilitate removal of such undesirable growths.

An object of the present invention is to provide a lawn renovating machine in which the rotary cutting element is structurally characterized to effectively operate upon trailing growths as well as prevent such growths from winding upon or clogging the element, with the rotary mounting for the latter being arranged to ruggedly support the element for smooth rotary operation with minimum friction, and with the inexpensive parts of the cutting element capable of being easily and simply assembled or disassembled to facilitate manufacture and use of the machine.

Another object of the invention is to provide a lawn renovating machine embodying means by which the cutting element can be adjusted vertically to operate upon growths at various heights above, on and below the surface of the ground, which adjustment can be instantly effected and the cutting element positively secured in any selected position of adjustment.

With these and other objects in view, the invention resides in the combinations and arrangements of elements as set forth in the following specification and particularly pointed out in the appended claims.

In the accompanying drawings,

Figure 3 is a transverse sectional view taken on the line 3—3 of Figure 2;

Figure 4 and Figure 5 are enlarged fragmentary sectional views taken respectively on the lines 4—4 and 5—5 of Figure 3;

Figure 6 is an enlarged fragmentary sectional view taken on the line 6—6 of Figure 2.

Referring specifically to the drawings, the invention is composed of a yoke frame F constructed of a pair of channel members suitably bent to provide two widely spaced parallel portions 10 and two narrowly spaced parallel portions 11 coacting with bolts 12 to rigidly clamp a handle 13 between such portions.

Figure 1:
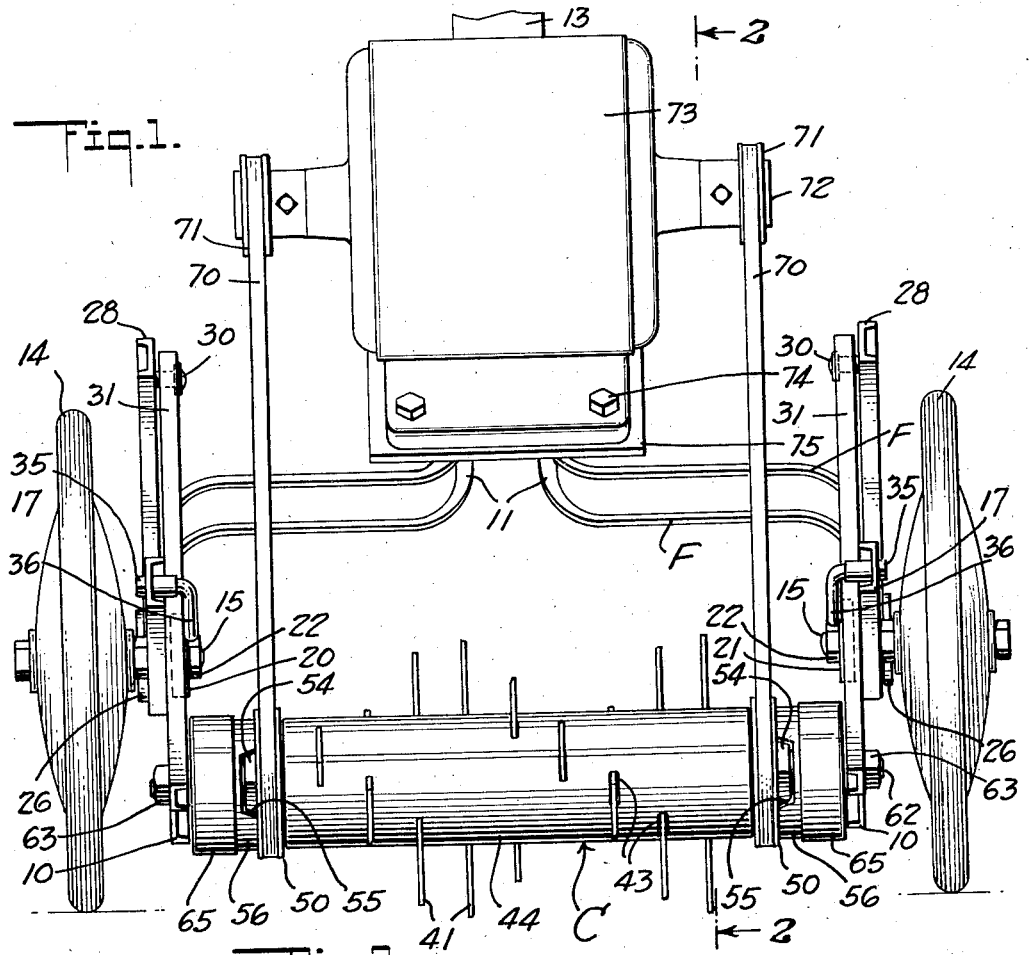
Figure 1 is a view of the lawn renovating machine in front elevation.
Figure 2:
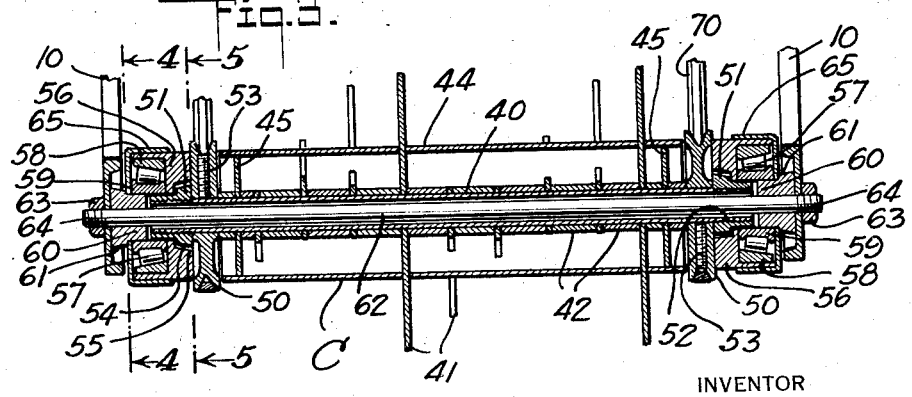
Figure 2 is a vertical longitudinal sectional view taken in the line 2—2 of Figure 1.

A pair of wheels 14 are journaled on stub axles 15 which project through openings 16 (Figure 6) intermediate the ends of adjusting arms 17, and through longitudinal slots 18 in the frame portions 10. As shown in Figures 2 and 6, the bolts also pass through openings in slide blocks 20, and are reduced in diameter and threaded at their outer ends to receive washers 21 and nuts 22 which secure the blocks on the bolts with sufficient clearance axially of the bolts for the blocks and adjusting arms 17 to slide freely on the frame portions 10.

The arms 17 are pivotally connected at their lower ends as indicated at 25 to links 26, with the latter pivotally connected at 27 to the lower ends of frame members 28 rigidly secured by rivets 29 to the frame portions 10 so as to be disposed at a right angle thereto and to extend above and below such frame portions as clearly shown in Figure 2.

Pivoted loosely on pins 30 secured to the upper ends of the adjusting arms 17 are holding arms 31 having longitudinal series of openings 32 through any of which pins 33 on the adjusting arms are adapted to extend to releasably retain the adjusting arms in a selected position of adjustment, it being noted that pivotal adjustment of such arms on the frame members 28 and the links 26, in the normal working position of the machine shown in Figure 2, will raise or lower the wheels 14 on the frame portions 10 with respect to the cutting element C journaled on such frame portions, whereby to vary the position of the cutting element vertically in relation to the surface of the ground on which the machine is operated.

Mounted on tight, friction creating pivots 35 on the arms 17 are latching levers 36 which, when swung to the latching position shown in full lines in Figure 2, overlie the holding arms 31 to confine the pins 33 in the selected opening 32 of the holding arms so as to secure the latter in the position to which they are adjusted. When the levers 36 are swung to the broken line position shown in Figure 2, the loose pivotal connections 30 of the holding arms 31 to the adjusting arms 17 permit the holding arms to be swung laterally to clear the pins 33 for a change in the adjusted position of the arms.

The cutting element C comprises a tubular shaft 40 extending through medial openings in double ended cutting blades 41 definitely spaced on the shaft by spacer sleeves 42, and maintained in helical formation by passing through helically arranged slots 43 in an open ended blade reinforcing and guard cylinder 44 within which the shaft 40 is maintained centered by means of disks 45 of a diameter to fit closely in the guard cylinder adjacent its ends as shown in Figure 3.

One, or two driven pulleys 50 as shown, are received in the ends of the shaft 40 projecting from the guard cylinder 44, and nuts 51 are applied to the ends of the shaft which are threaded at 52 for co-action in clamping the blades 41 tightly on the shaft, the pulleys being provided with suitable set screws 53 to lock them to the shaft.

The non-circular heads 54 of the nuts 51 are received in diametric slots 55 in cup shaped bearing housings 56 receiving suitable anti-friction bearings 57 of the ball type or roller type as shown, the outer races 58 of the bearings seating in the housings, and the inner races 59 receiving centering bushings 60 having non-circular heads 61 co-acting with the side flanges of the frame portions 10 in preventing rotation of the bushings.

A tie rod 62 extends freely through the tubular shaft 40, and closely through the bushings 60 and frame portions 10, with nuts 63 being applied to the outer threaded ends 64 of the rods for co-action therewith in demountably supporting the cutting element for rotation on the frame. Dust caps 65 are mounted on the cylindrical portions of the bushings 60 and telescopically receive the housings 56 to protect the bearings 57 against foreign substances.

In the present instance the pulleys 50 are connected by belts 70 to driving pulleys 71 on the ends of the armature shaft 72 of an electric motor 73 secured by bolts 74 to a suitable platform 75 on the handle portion of the frame, all to the end of providing a power drive for the cutting element to rotate the latter at a high speed in the direction of the arrow in Figure 2, when the machine is guided forwardly over the lawn to be operated upon.

From the foregoing description it will be manifest that suitable manipulation of the adjusting and holding arms 17 and 31 respectively, will enable the height of the cutting element C to be varied for most effective operation upon the particular growths encountered in practice.

Furthermore, by virtue of the construction and mounting of the cutting element above described, the mounting and demounting of the element as well as the assembling and disassembling of its parts can be accomplished with ease and dispatch, and that the heavy duty anti-friction bearings of the element insure absolutely smooth operation with minimum friction and expenditure of power.

I claim:

1. In a machine of the class described, a frame having slots disposed vertically in the working position of the machine; a cutting element rotatably mounted in the frame; wheels having axles mounted in said slots for adjustment along the lengths thereof to vertically adjust the wheels relative to the frame so as to vary the height of the cutting element with respect to the ground surface supporting the wheels; adjusting arms pivotally mounted on the frame and receiving said axles to shift the latter along the lengths of the slots in response to pivotal movement of the arms; and means co-acting with the arms to releasably retain the latter in any one of a plurality of adjusted positions.

2. In a machine of the class described, a frame having slots disposed vertically in the working position of the machine; a cutting element rotatably mounted in the frame; wheels having axles mounted in said slots for adjustment along the lengths thereof to vertically adjust the wheels relative to the frame so as to vary the height of the cutting element with respect to the ground surface supporting the wheels; adjusting arms pivotally mounted on the frame and receiving said axles to shift the latter along the lengths of the slots in response to pivotal movement of the arms; said adjusting arms having holding pins; holding arms pivotally mounted on the frame and having series of openings along the length thereof for co-action with said pins in holding the adjusting arms in any selected position of adjustment; and means for confining the holding arms against displacement from said pins.

3. In a machine of the class described, a frame having slots disposed vertically in the working position of the machine; a cutting element rotatably mounted in the frame; wheels having axles mounted in said slots for adjustment along the lengths thereof to vertically adjust the wheels relative to the frame so as to vary the height of the cutting element with respect to the ground surface supporting the wheels; adjusting arms pivotally mounted on the frame and receiving said axles to shift the latter along the lengths of the slots in response to pivotal movement of the arms; said adjusting arms having holding pins; holding arms pivotally mounted loosely on the frame and having longitudinal series of openings adapted to co-act with said pins in holding the adjusting arms in any selected position of adjustment; and latching levers pivoted on the adjusting arms and co-actable with the holding arms to prevent lateral displacement of the latter so as to confine the holding arms on said pins.

4. In a machine of the class described, a frame; a cutting element comprising: a tubular shaft; a driven element on the shaft; spaced blades mounted on said shaft; nuts threaded on said shaft co-acting to clamp said blades thereon; bearing housings enclosing the nuts means co-acting with said nuts and with said bearing housings and including inner races to provide driving connections therebetween; anti-friction bearings in the housings; a tie rod extending through said shaft and through said bearings; centering bushings through which said tie rod extends, receiving the inner races of said bearings to support the bearings and shaft in co-axial relationship; and means for securing the tie rod to the frame to mount the cutting element for rotation.

5. In a machine of the class described, a frame; a cutting element comprising: a tubular shaft; a driven element on the shaft; spaced blades mounted on said shaft; nuts threaded on said shaft co-acting to clamp said blades thereon; bearing housings; said nuts having non-circular portions and said housings having slots receiving said portions to provide a driving connection between the housings and shaft; anti-friction bearings having inner and outer races with their outer races seated in said housings; centering bushings receiving the inner races of said bearings and having means co-acting with the frame to prevent rotation of the bushings; a tie rod extending through the shaft and through the bushings and frame; and nuts threaded on the tie rod to demountably support the cutting element for rotation in the frame.

6. In a machine of the class described, a frame; a cutting element comprising: a tubular shaft having threaded ends; blades receiving said shaft; spacer sleeves on said shaft between blades; a guard cylinder through which the blades project; disks receiving said shaft and guard cylinder to center the shaft in the cylinder; a driven element on the shaft; nuts on the ends of the shaft for clamping the blades thereon, and having non-circular heads; bearing housings having inner races and having slots receiving said heads to provide a driving connection between the housings and shaft; centering bushings extending into the inner races of the bearings and having non-circular heads co-acting with the frame to prevent rotation of the bushings; a tie rod extending through the shaft, bushings and frame; and nuts on the tie rod co-acting therewith to mount the cutting element for rotation in the frame.

7. In a machine of the class described, a frame; a cutting element comprising: a tubular shaft; blades mounted on the shaft, sleeves mounted on the shaft and disposed between the blades for spacing them apart; at least one pulley mounted on the shaft; nuts threaded onto the shaft ends for clamping the blades, sleeves and pulley rigidly to the shaft; anti-friction bearings rotatably supporting the nuts; a tie rod extending through said shaft and bearings; centering bushings for supporting the bearings and receiving the tie rod ends; and means for securing the tie rod to the frame to mount the cutting element for rotation.

8. In a machine of the class described, a frame; a cutting element comprising: a tubular shaft; blades mounted on the shaft, sleeves mounted on the shaft and disposed between the blades for spacing them apart; at least one pulley mounted on the shaft; nuts threaded onto the shaft ends for clamping the blades, sleeves and pulley rigidly to the shaft; anti-friction bearings rotatably supporting the nuts; a tie rod extending through said shaft and bearings; centering bushings for supporting the bearings and receiving the tie rod ends; means for securing the tie rod to the frame to mount the cutting element for rotation; and a cylinder enclosing the shaft and sleeves and having slots therein through which the blades extend.

9. In a machine of the class described, a frame; a cutting element comprising: a tubular shaft; spaced blades mounted on said shaft; nuts threaded on said shaft coacting to clamp said blades thereon; bearing housings; said nuts having non-circular portions and said housings having slots receiving said portions to provide a driving connection between the housings and shaft; anti-friction bearings having inner and outer races, and outer races being seated in said housings; centering bushings receiving the inner races of said bearings and having means coacting with the frame to prevent rotation of the bushings; a tie rod extending through the shaft, bushings and frame; and nuts threaded on the tie rod to demountably support the cutting element for rotation in the frame.

SEGFRID J. LINDSKOG.